(12) United States Patent
Stahley

(10) Patent No.: US 6,771,821 B1
(45) Date of Patent: Aug. 3, 2004

(54) HIGH-SPEED IMAGE TRANSFER SYSTEM

(75) Inventor: William Stahley, Costa Mesa, CA (US)

(73) Assignee: Keystone International, Palm Springs, CA (US)

( * ) Notice: Subject to any disclaimer, the term of this patent is extended or adjusted under 35 U.S.C. 154(b) by 0 days.

(21) Appl. No.: 09/444,946

(22) Filed: Nov. 22, 1999

Related U.S. Application Data

(60) Provisional application No. 60/109,436, filed on Nov. 23, 1998.

(51) Int. Cl.[7] .......................... G06K 9/36; H04N 11/00; H03M 13/00
(52) U.S. Cl. ......................... 382/232; 348/466; 714/752
(58) Field of Search ............................... 382/232, 209, 382/233, 194; 348/466, 461; 713/179, 176, 175; 714/752, 755, 746; 341/94; 358/1.15, 1.5

(56) References Cited

U.S. PATENT DOCUMENTS

| | | | | |
|---|---|---|---|---|
| 5,070,503 A | * | 12/1991 | Shikakura | 714/776 |
| 5,617,333 A | * | 4/1997 | Oyamada et al. | 709/247 |
| 5,809,041 A | * | 9/1998 | Shikakura et al. | 714/747 |
| 5,926,550 A | * | 7/1999 | Davis | 713/176 |
| 6,085,348 A | * | 7/2000 | Shimizu | 714/755 |
| 6,145,109 A | * | 11/2000 | Schuster et al. | 714/752 |
| 6,188,766 B1 | * | 2/2001 | Kocher | 380/246 |

* cited by examiner

Primary Examiner—Wenpeng Chen
(74) Attorney, Agent, or Firm—Allen A. Dicke, Jr.

(57) ABSTRACT

This invention is directed to the transferring of information in two-dimensional form. The form may be an image or may be printed word. The information is converted to a digital bit map. The bit map information is compressed by any compression technique (JPEG, MPEG, WAVELET, FRACTAL, etc.) and at the same time a first forward error-correcting code is generated of the bit map. The compressed information and the first forward error-correction code is formed into a data packet. These packets are transmitted with a second forward error-correcting code of the packet in order to correct any transmission errors. After correcting any transmission errors found at the receiving end as a result of the second forward error correction code, the data stream is decompressed, and an image bit map is regenerated. The first forward error-correction code is applied, and the bit map is corrected. This data bit map is converted to be compatible with the receiving equipment format so that it can be displayed optimally by the receiving equipment.

17 Claims, 1 Drawing Sheet

HIGH-SPEED IMAGE TRANSFER SYSTEM

CROSS-REFERENCE

This application relies upon Provisional Application Serial No. 60/109,436, filed Nov. 23, 1998 for priority.

FIELD OF THE INVENTION

This invention is directed to the field of transferring information in two-dimensional form. The form may be an image or may be printed word. The information is converted to a digital bit map. The bit map information is compressed by any compression technique (JPEG, MPEG, WAVELET, FRACTAL, etc.) and at the same time a first forward error-correcting code is generated of the bit map. The compressed information and the first forward error-correction code is formed into data packets. These packets are transmitted with a second forward error-correcting code of the packet in order to correct any transmission errors. After correcting any transmission errors found at the receiving end as a result of the second forward error correction code, the data stream is decompressed, and an image bit map is regenerated. The first forward error-correction code is applied, and the bit map is corrected. This data bit map is converted to be compatible with the receiving equipment format so that it can be displayed optimally by the receiving equipment.

BACKGROUND OF THE INVENTION

The transfer of image data on a wire or RF data link is limited by the size of the data file and the digital data transfer transmission capability of the data link. An increase in data capacity over a data link can be achieved by compression of the data stream file size. However, decompression of the data stream often produces errors in the image due to the compression/decompression processes. Error-correction information can be generated and transmitted along with the compressed data, but unless the error-correction information is almost as great as the reduction in size due to compression, errors may occur during the transmission.

There is need for a high-speed image transfer system which compresses bit map data using psycho-visual limitations so the parts of the image which are lost by the compression will not be visually detectable. Thus, upon decompression and correction, no visually useful information is lost.

SUMMARY OF THE INVENTION

In order to understand this invention it can be stated in essentially summary form that it is directed to a system which provides high speed image transfer. The information is converted to a digital bit map. The bit map information is compressed and at the same time a first forward error-correcting code is generated of the bit map. The compressed information and first forward error-correcting code are formed into data packets that will be transmitted. A second forward error-correction code is generated for the packets and is transmitted along with the packets. The received packets and second forward error-correction code will be used for correcting any transmission errors. After correction, the data stream is decompressed, and an image bit map is regenerated. The first forward error-correction code is applied to compensate for compression errors, and the bit map is corrected. This data bit map is then converted to the resolution of the receiving equipment format so that an optimum display of the input data is delivered to receiving equipment.

It is a purpose and advantage of this invention to provide a high-speed image transfer system by which an image is compressed to a minimum value by using psycho-visual limitations.

It is another purpose and advantage of this invention to provide a high-speed image transfer system using a first forward error-correction coding on a bit map of the image so that, after the bit map image is compressed and decompressed, the decompressed image can be restored to its visually useful original value.

It is another purpose and advantage of this invention to adjust the output display of the bit map image to correspond to the resolution of the output equipment to which it is delivered.

Other purposes and advantages of this invention will become apparent from the following portion of the specification and the attached drawings.

DESCRIPTION OF THE PREFERRED EMBODIMENT

Figure 1:
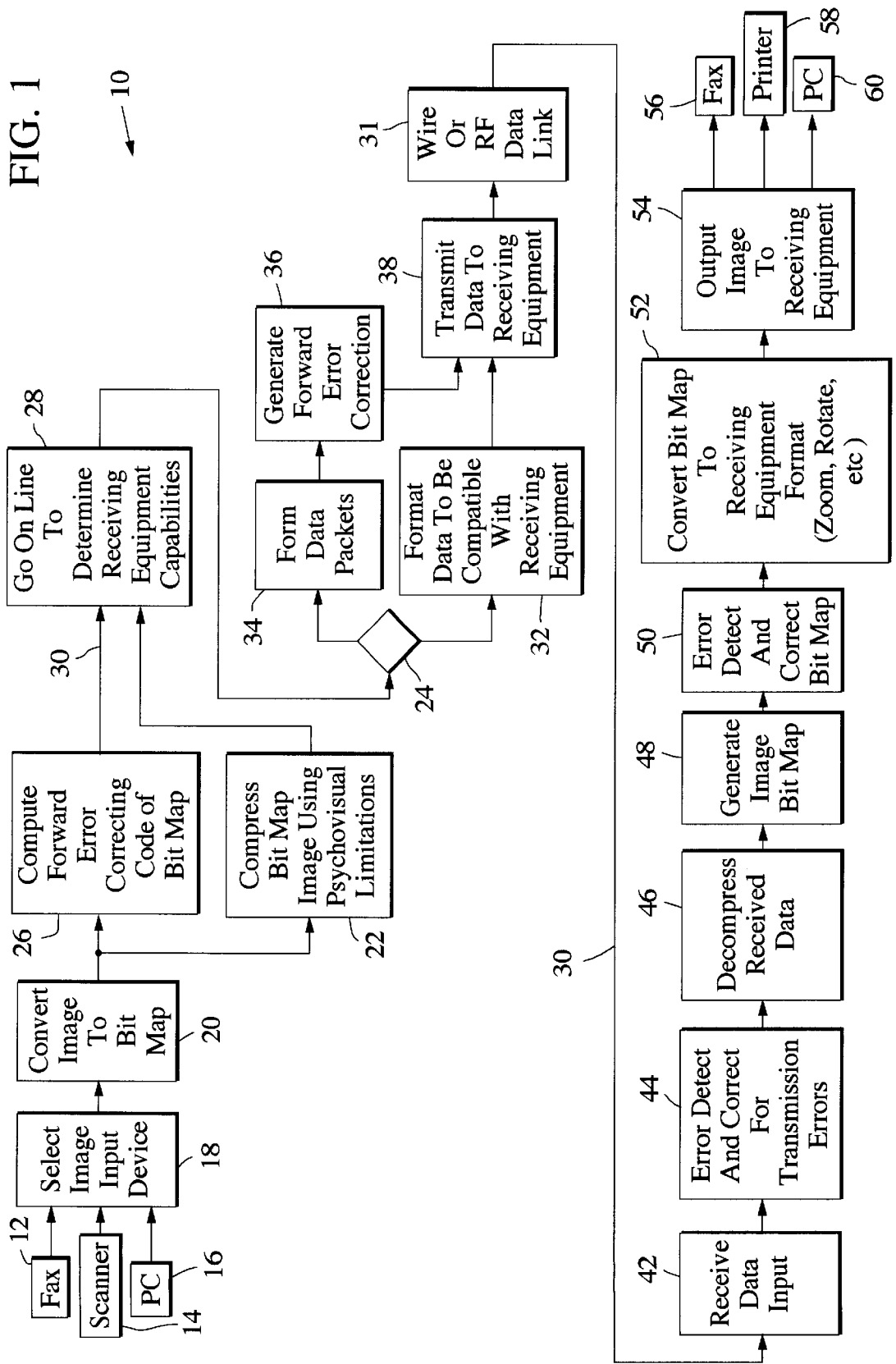
FIG. 1 is a block diagram of the high-speed image transfer system of this invention.

The high-speed image transfer system of this invention is generally indicated at 10 in FIG. 1. The system 10 shows the system components in block diagram configuration. Each of the blocks represents a component or circuit which is available off-the-shelf. To describe the system 10, the manner the signals representing the image will be processed is discussed with respect to each block. The input image may be any conventional input, such as a FAX machine 12, an image scanner 14, or a personal computer 16. Selector 18 is a switch which detects which input is receiving the image and connects to that input. The output from switch 18 goes to converter 20, where the image is converted to a bit map.

The bit map data goes to compression system 22, where the image data is compressed using psycho-visual limitations. During compression, it is noted that any pixel string less than 3 pixels long is not seeable by the eye. Thus, during compression, all pixel strings less than 3 in length are deleted. Any conventional compression system can be used. Examples of such compression systems are JPEG, MPEG, FRACTAL, WAVELET, and the like. The compressed bit map image signal is delivered to the interrogator block 28 that goes on-line to determine the capabilities of the receiving equipment. While the bit map is being compressed, a first forward error-correcting code of the bit map is being generated at code generator 26. The first forward error-correction code is combined with the compressed bit map signal as it is delivered to the interrogator 28 that goes on-line to determine the capabilities of the receiving equipment. The forward error-correction code for the bit map may be computed by one of the common programs available for this purpose, such as Reed Solomon, LZW, and the like. This parity type correction code is generated and sent along with the compressed bit map data.

The high-speed image transfer system is configured to be compatible with like high-speed image transfer systems and also to be compatible with conventional systems so that the system 10 can be universally employed. The interrogator 28 goes on-line and determines the capabilities of the receiving equipment which is connected to receive the data. If it is standard, conventional equipment, then the switch 24 connects to formatter 32, which formats the signal to be compatible with the standard receiving equipment. No increase in speed can be achieved when the receiving equipment is of conventional nature. If it is detected that there is a standard FAX machine or the like on the receiving end, then the compression and correction system will not be useful. Thus, if standard equipment is found on the receiving end, the formatter 32 will reformat back to standard data, such as suitable for FAX data transmission.

For the purpose of this disclosure, the on-line equipment which will receive the signal has decompression and correction equipment on the receiving end which is compatible with the present high-speed image transfer system. Such equipment is illustrated. In that case, the interrogator 28 will detect the high-speed image receiving equipment shown in FIG. 1 and the switch 24 is connected to deliver the compressed data and the forward error-correction code to the data packet former 34. The data packets are delivered through a second forward error-correction circuit 36 to correct for any transmission errors. The data packet with the second forward error-correction signal passes through transmitter 38 and link connector 31 to either wire or RF data link 30. The transmitter 38 is the end of the transmitting equipment, and the link 30 connects to the receiving equipment.

The transmitted data is received by receiver 42, and the received signal is detected and corrected for transmission errors within correction circuit 44. This correction is the data transmission correction based on the parity generated by the second forward error-correction circuit 36. Each compressed signal packet still carries with it in the first forward error-correction code for the bit map generated at circuit 26. Decompressor 46 delivers a decompressed bit map signal, and the bit map image is generated in assembler 48. The first error-correcting code transmitted in the same packet with the compressed bit map signal is applied at correction circuit 50 to regenerate the original bit map, which is seen in converter 20. This bit map information is then converted to a format which is compatible with the output device in converter 52. Converter 52 formats the bit map into the proper orientation and size.

The output of a standard facsimile machine is a resolution of 1728 pixels per line across the sheet and about 100 per inch along the sheet. The output controller 54 provides the proper output for this equipment. A printer may have a resolution of 600 pixels per line, or more, in each direction. The screen on a personal computer has resolution of 480 pixels per line. In each case, the output controller 54 supplies the correct data in a format that corresponds to the resolution of the receiving equipment. It can be arranged to supply data in the proper output format for any chosen equipment.

Output controller 54 also switches the output signal to the appropriate receiving equipment, which may be a facsimile machine 56 which prints out the message, another type of printer 58 which forms a visible image on paper, or a computer monitor screen 60. With this equipment, compression by a factor of 150, as compared to a standard facsimile machine, will significantly reduce on-line transfer time. FAX data transfer rate would be improved by a factor of 50.

This invention has been described in its presently contemplated best embodiment, and it is clear that it is susceptible to numerous modifications, modes and embodiments within the ability of those skilled in the art and without the exercise of the inventive faculty and within the scope of the following claims.

What is claimed is:

1. A high-speed image transfer system comprising:
   a bit map image source containing a selected image in bit map format;
   a first forward error-correcting generator connected to receive said image in bit map format and having an output line containing a first forward error-correcting code for the image in bit map format;
   a compressor which is also connected to said bit map image source to compress the image in bit map format to a compressed state to result in a compressed bit map signal;
   a combiner connected to receive both the first forward error-correcting code and the compressed bit map signal and form a first combined data stream;
   a former connected to said combiner to receive the first combined data stream and form the first combined data stream into data packets;
   a second forward error correcting generator for receiving the data packets and generating a second forward error-correcting signal and combining the second forward error-correcting signal with the data packets to form a second combined data stream;
   a transmitter to transmit the second combined data stream;
   a receiver connected to said transmitter to receive the second combined data stream;
   a first error detector and corrector connected to said receiver for utilizing the second forward error-correcting signal to correct any transmission errors in the compressed bit map signal to form a corrected compressed bit map signal;
   a decompressor connected to receive the corrected compressed bit map signal from said first error detector and corrector to decompress the received corrected compressed bit map signal;
   a bit map image generator connected to said decompressor for reconstructing a bit map image from the decompressed signal;
   a second error detector and corrector connected to said bit map image generator to utilize the first forward error-correcting code to detect errors and correct the reconstructed bit map image coming from said bit map generator to produce a corrected reconstructed bit map signal.

2. The high-speed image transfer system of claim 1 further including a convertor connected to said second error detector and corrector for converting the corrected reconstructed bit map signal to receiving equipment format.

3. The high-speed image transfer system of claim 2 further comprising an output device selected from the group comprising a facsimile receiver, a printer and a computer to utilize the corrected reconstructed bit map signal.

4. The high-speed image transfer system of claim 1 further including a device selected from the group comprising a facsimile machine, an image scanner and a computer which is said image source which is connected to said first forward error-correcting generator to supply an image to said first forward error-correcting generator.

5. The high-speed image transfer system of claim 1 wherein there is a switch connected to the output of said combiner, said switch having a first output which is input to said former for forming data packets and said switch has a second output through a format detector to said transmitter so that when said second output is energized, said former for forming data packets and said generator for generating a second error-correcting signal are bypassed, and there is a sensor connected to control said switch, said sensor detecting receiving equipment capability to determine the position of said switch to energize said former for forming data packets or said transmitter.

6. The high-speed image transfer system of claim 5 further including a convertor connected to said second error detector and corrector for converting the corrected reconstructed bit map signal to receiving equipment format.

7. The high-speed image transfer system of claim 6 further comprising an output device selected from the group comprising a facsimile receiver, a printer and a computer to utilize the corrected reconstructed bit map signal.

8. The high-speed image transfer system of claim 2 wherein said bit map image generator is connected to convert the reconstructed bit map image to receiving equipment format including adjusting of the reconstructed image to correspond to the resolution of the receiving equipment.

9. The high-speed image transfer system of claim 8 further comprising an output device selected from the group comprising a facsimile receiver, a printer and a computer to utilize the corrected reconstructed bit map signal.

10. A high-speed image transfer system comprising:
  a source of digital image data;
  a first converter connected to said source of digital image data, said first converter converting the image data to a digital bit map data stream;
  a circuit connected to said first converter for generating a first forward error-correcting code of the digital bit map data stream;
  a data compressor also connected to said first converter, said data compressor compressing the digital bit map data stream to produce a compressed digital bit map data stream;
  a combiner connected to both said circuit and said data compressor to combine the compressed digital bit map data stream with the first forward error-correcting code to form a combined data stream;
  a data packet former connected to said combiner to form data packets therefrom;
  a second forward error-correcting generator connected to said data packet former to generate a second forward error-correcting signal and combine the second forward error-correcting signal with the data packets to form a transmission signal;
  a transmitter to transmit the transmission signal;
  a receiver connected to said transmitter to receive the transmission signal;
  a first error detector and corrector for correcting transmission errors based on the error-correcting signal generated by said second forward error-correcting generator to create a corrected image data stream;
  a decompressor connected to said first error detector and corrector for decompressing the image data stream;
  an image generator connected to said decompressor to generate a bit map image from the corrected and decompressed data stream;
  a second error detector and corrector connected to said image generator for correcting the bit map image in accordance with the first forward error-correcting code of the original bit map so that a corrected reconstructed digital bit map is created.

11. The high-speed image transfer system of claim 10 further including:
  a second converter connected to said second error detector and corrector to rotate and zoom the bit map to receiving equipment format;
  an output image adjustor connected to said second converter; and
  an image output device connected to said image output adjustor to create a finished image;
  wherein the adjuster adjusts data of the bit map to the limitations of the output device.

12. The high-speed image transfer system of claim 11 wherein said image output device is selected from the group comprising a facsimile machine, a hard-copy printer and a computer.

13. The high-speed image transfer system of claim 10 wherein the digital bit map data stream comes from a device selected from the group comprising a facsimile machine, a digital scanner and a computer.

14. The high-speed image transfer system of claim 11 wherein said combiner also determines the capabilities of the receiver;
  a switch connected to be controlled by said combiner in accordance with the capabilities, said switch having a first output connected to said data packet former, said switch having a second output connected to a formatter, said formatter formatting the combined data stream to be compatible with the capabilities, said formatter being connected to said transmitter so that when said switch selects said second output, said data packet former and said second forward error-correcting generator are bypassed.

15. The high-speed image transfer system of claim 14 further including:
  a second convertor connected to said second error detector and corrector to rotate and zoom the bit map to receiving equipment format;
  an output image adjustor connected to said second converter; and
  an image output device connected to said image output adjustor to create a finished image;
  wherein the adjuster adjusts data of the bit map to the limitations of the output device.

16. The high-speed image transfer system of claim 15 wherein said image output device is selected from the group comprising a facsimile machine, a hard-copy printer and a computer.

17. The high-speed image transfer system of claim 14 wherein said source of original digital image data comes from a device selected from the group comprising a facsimile machine, a digital scanner and a computer.

* * * * *